(12) United States Patent
Hikmat et al.

(10) Patent No.: US 7,597,363 B2
(45) Date of Patent: Oct. 6, 2009

(54) REINFORCING RING FOR A PLASTIC FITTING AND PLASTIC FITTING INCORPORATING A REINFORCING RING

(75) Inventors: Rabih Hikmat, Laval (CA); Robert Laflamme, Verdun (CA)

(73) Assignee: Ipex Inc., Verdun (CA)

( * ) Notice: Subject to any disclaimer, the term of this patent is extended or adjusted under 35 U.S.C. 154(b) by 239 days.

(21) Appl. No.: 11/356,954

(22) Filed: Feb. 21, 2006

(65) Prior Publication Data

US 2007/0096467 A1    May 3, 2007

(30) Foreign Application Priority Data

Oct. 27, 2005    (CA)    .................................... 2524768

(51) Int. Cl.
*F16L 15/00*    (2006.01)

(52) U.S. Cl. .................. 285/392; 285/290.2; 285/291.1

(58) Field of Classification Search ................. 285/390, 285/392, 355, 357, 290.2, 290.3, 293.1, 291.2, 285/291.1; 138/96 T; 215/42, 44
See application file for complete search history.

(56) References Cited

U.S. PATENT DOCUMENTS

| 229,063 | A | * | 6/1880 | Story | ........................... 215/42 |
|---|---|---|---|---|---|
| 2,702,565 | A | * | 2/1955 | Moritz et al. | .................. 138/89 |
| 3,352,574 | A | * | 11/1967 | Brian | ........................... 285/355 |
| 3,899,004 | A | * | 8/1975 | Farelli | ......................... 285/391 |
| 4,093,280 | A | * | 6/1978 | Yoshizawa et al. | ........... 285/390 |
| 4,179,142 | A | * | 12/1979 | Schopp | ........................ 285/390 |
| 4,335,753 | A | | 6/1982 | Freye | |
| 4,655,256 | A | * | 4/1987 | Lasota et al. | ................ 138/96 T |
| 4,682,797 | A | | 7/1987 | Hildner | |
| 4,756,857 | A | * | 7/1988 | Dezio et al. | .................... 215/44 |
| 5,109,929 | A | * | 5/1992 | Spears | .................... 285/148.13 |
| 5,366,257 | A | * | 11/1994 | McPherson et al. | .......... 285/330 |
| 5,437,481 | A | * | 8/1995 | Spears et al. | ................. 285/330 |
| 5,454,675 | A | * | 10/1995 | DeHaitre | ..................... 411/303 |
| 5,582,435 | A | | 12/1996 | Goto et al. | |
| 5,582,439 | A | | 12/1996 | Spears | |
| 6,186,558 | B1 | | 2/2001 | Komolrochanaporn | |
| 6,866,305 | B2 | | 3/2005 | Spears | |
| 6,991,268 | B2 | * | 1/2006 | Spears | ......................... 285/392 |
| 2003/0184085 | A1 | | 10/2003 | Thompson | |
| 2004/0051316 | A1 | | 3/2004 | Spears | |

FOREIGN PATENT DOCUMENTS

JP    02 299929    12/1990

* cited by examiner

*Primary Examiner*—David E Bochna

(57) ABSTRACT

A reinforcing and a plastic fitting incorporating such a reinforcing ring are disclosed. The reinforcing ring and plastic fitting have particular utility with respect to fire sprinkler heads in buildings. The reinforcing ring has a single starter thread which is integrally formed with a guide portion which guides a male part to be axially in line with the female fitting.

18 Claims, 4 Drawing Sheets

REINFORCING RING FOR A PLASTIC FITTING AND PLASTIC FITTING INCORPORATING A REINFORCING RING

FIELD OF THE INVENTION

This invention relates to a reinforcing ring for a plastic fitting and a plastic fitting incorporating such a reinforcing ring. The invention has particular utility with respect to fire sprinkler heads in buildings, although it will also have utility with other applications.

BACKGROUND OF THE INVENTION

In the past, plastic fittings have been used for receiving a threaded male part, typically a threaded pipe. Also, in the past, reinforcing rings have been used to reinforce plastic fittings, such as described in U.S. Pat. Nos. 5,582,439 and 6,866,305 to Spears and U.S. Patent Application 2004/0051316 to Spears. Also, U.S. Pat. No. 4,682,797 to Hildner and U.S. Pat. No. 6,186,558 to Komolrochanapom, as well as U.S. Patent Application 2003/0184085 to Thompson, disclose a reinforcing ring used with plastic fittings.

Although reinforcing rings that have been made in the past, and used with plastic fittings, there have been problems with such rings and fittings, particularly relating to cross-threading and shearing. Therefore, the present invention provides an improved reinforcing ring and an improved fitting incorporating the reinforcing ring.

One problem is that when the male part which is being inserted into the plastic fitting is over-tightened, there is a tendency for the plastic fitting to shear.

Also, cross-threading occurs when the thread axis of the male part is not properly aligned relative to the female fitting's thread axis. All plastic thread design is susceptible to cross-threading. One way of at least reducing the risk of cross-threading is to guide the male part to be axially in line with the female fitting. Another way to lessen the likelihood of cross-threading is to reinforce the first few plastic threads of the fitting with a harder material. The present invention has been able to successfully combine both of these approaches to provide an improved method of reducing the likelihood of cross-threading using only a single starter thread. None of the prior art reinforcing rings use only a single starter thread.

SUMMARY OF THE INVENTION

Accordingly, it is an object of this invention to at least partially overcome the disadvantages of the prior art. Also, it is an object of this invention to provide an improved reinforcing ring for plastic fittings and an improved plastic fitting incorporating the reinforcing ring.

Accordingly, in one of its aspects, this invention resides in providing a reinforcing ring for a plastic fitting, comprising: a first tubular portion; a radial portion extending radially inwardly from a forward end of the tubular portion; a guide portion extending rearwardly from a radially-inner region of the radial portion; and a starter thread extending radially inwardly from a rearward end of the guide portion.

In a further aspect, the present invention resides in providing a plastic fitting for receiving a threaded male part, comprising: a plastic body having inner plastic threads for receiving the male part in threaded engagement; and a reinforcing ring as described above wherein the first tubular portion of the reinforcing ring surrounds at least a portion of the plastic body.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
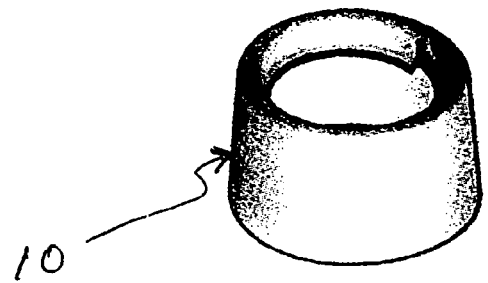
FIG. 1 is a perspective view of a preferred embodiment of the reinforcing ring of the invention.
Figure 3:
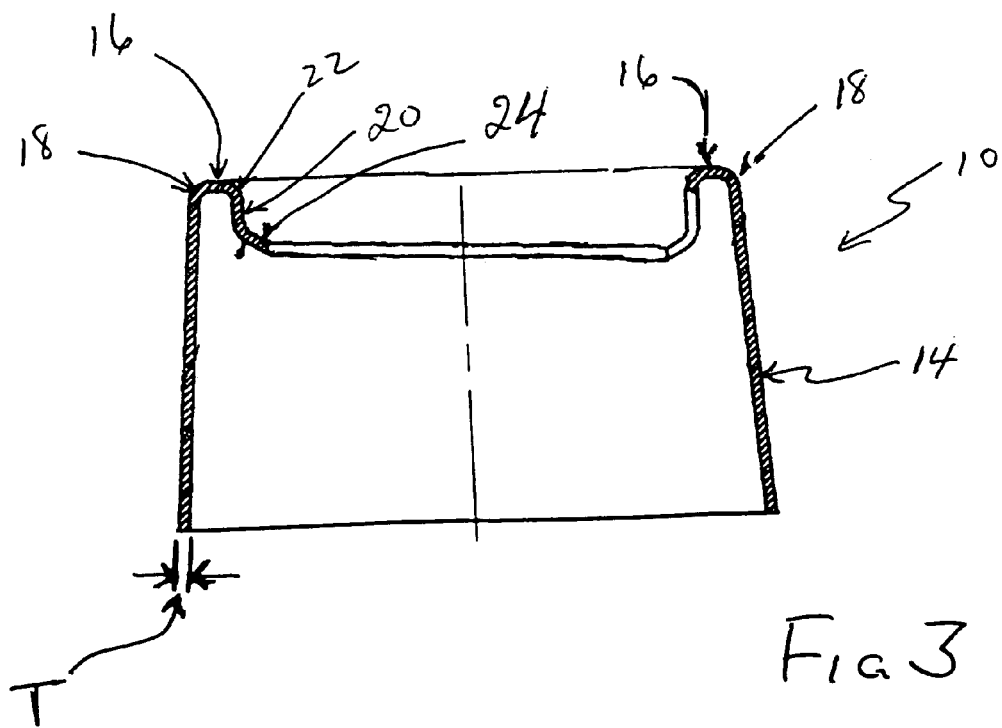
FIG. 3 is a cross-sectional view though line A-A in FIG. 2 of a preferred embodiment of the reinforcing of the invention.
Figure 4:
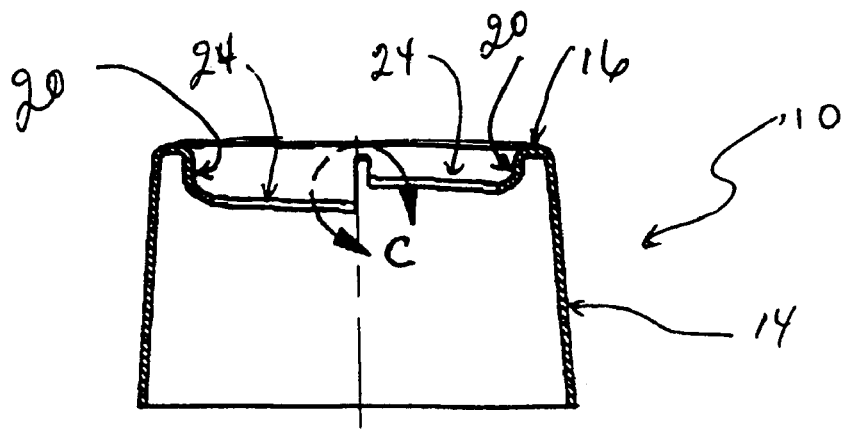
FIG. 4 is another cross-sectional view through line B-B in FIG. 2 of a preferred embodiment of the reinforcing ring of the invention.
Figure 5:
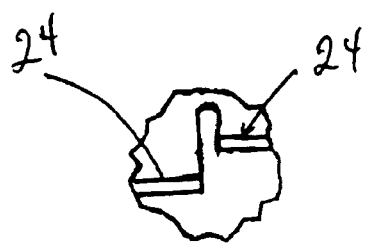
FIG. 5 is a detail of a portion "C" from FIG. 4 of one embodiment of the reinforcing ring of the invention.
Figure 6:
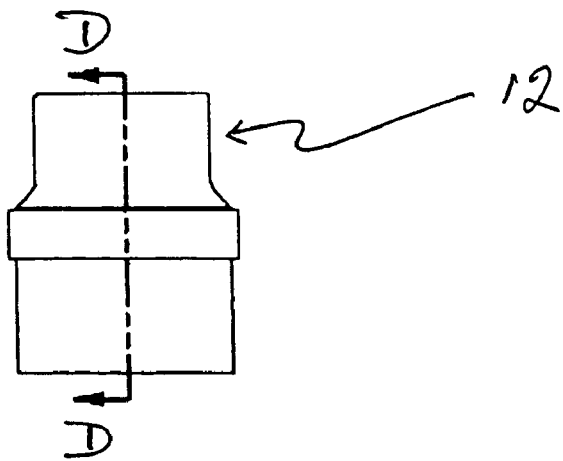
FIG. 6 is a side view of a preferred plastic fitting of the invention.

As shown in FIG. 1, one embodiment of the present invention relates to a reinforcing ring 10 for a plastic fitting 12. As best seen in FIG. 3, the reinforcing ring 10 comprises a first tubular portion 14 and a radial portion 16 which extends radially inwardly from a forward end 18 of the tubular portion 14. There is also a guide portion 20 extending rearwardly from a radially-inner region 22 of the radial portion 16. Also, there is a starter thread 24 extending radially inwardly from a rearward end 26 of the guide portion 20.

In one preferred embodiment, the guide portion 20 is tubular. In another preferred embodiment, the guide portion 20 is conical and extends rearwardly and inwardly as seen in FIG. 3.

Preferably, the tubular portion 14 is conical, preferably at about 86° from horizontal, but the tubular portion 14 may be cylindrical (90° from horizontal).

Preferably, the reinforcing ring 10 is stamped from a metal sheet 42 and in a more preferred embodiment the ring is made of stainless steel.

Preferably, the reinforcing ring 10 is stamped from the steel sheet 42, preferably a stainless steel sheet.

When the reinforcing ring 10 is stamped in this manner, the starter thread 24 is no more than 360° around the guide portion 20. In a preferred embodiment, the starter thread 24 is 360° around the guide portion 20. In another preferred embodiment, the starter thread is less than 360° around the guide portion as seen in FIG. 2.

Figure 2:
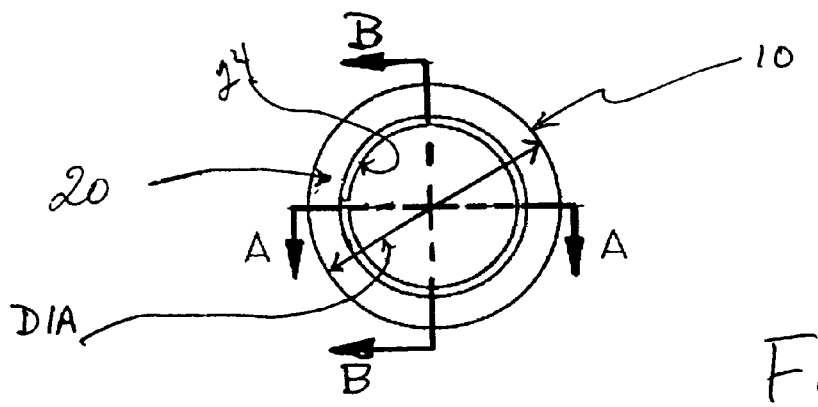
FIG. 2 is a top view of a preferred embodiment of the reinforcing ring of the invention.

As will be seen from the Figures, the reinforcing ring 10, particularly when stamped from a metal sheet 42, is dimensioned such that the thickness T of each of the first tubular portion 14, the radial portion 16 and the guide portion 20 (as best seen in FIG. 3) is relatively small or thin compared to the diameter DIA of the first tubular portion 14 as best seen in FIG. 2. Thus, an appropriate thickness T of metal sheet 42 is selected in order to make the reinforcing ring 10 appropriately dimensioned.

Figure 7:
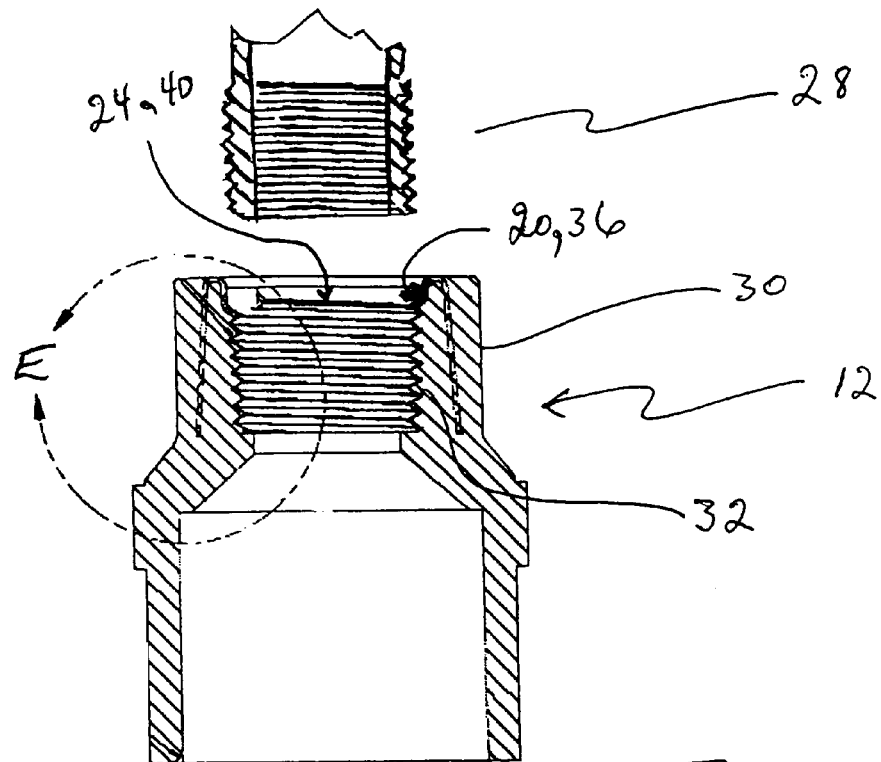
FIG. 7 is a cross-sectional view through line D-D in FIG. 6 of a preferred embodiment of a fitting of the invention.
Figure 8:
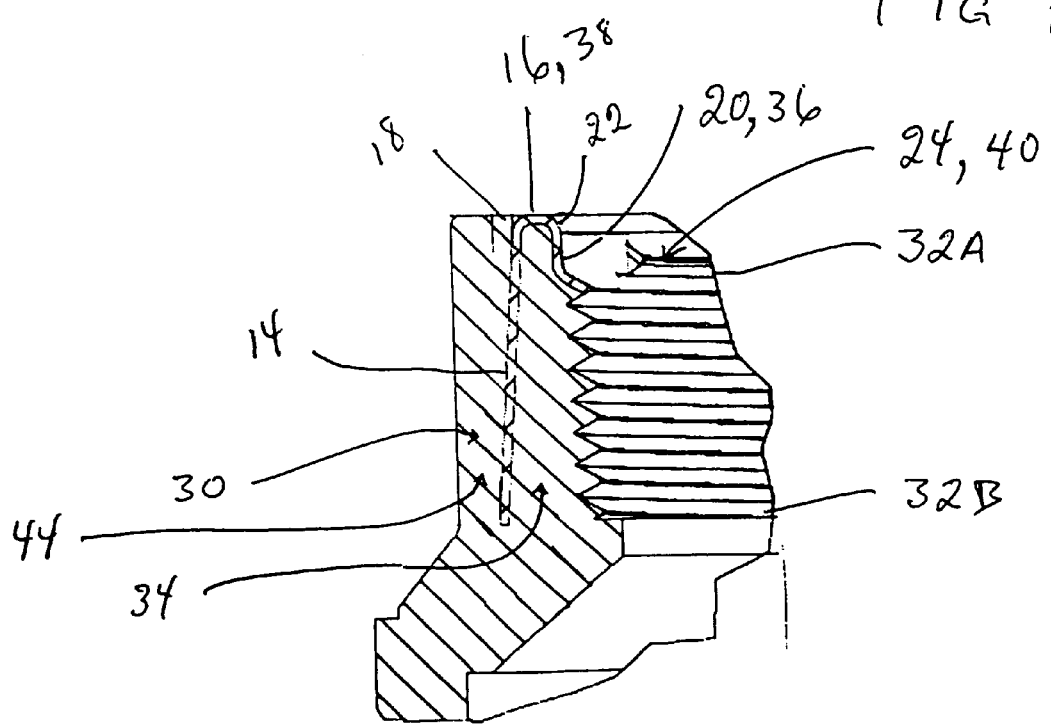
FIG. 8 is a detail of a portion "E" from FIG. 7 of a preferred embodiment of the fitting of the invention.
Figure 9:
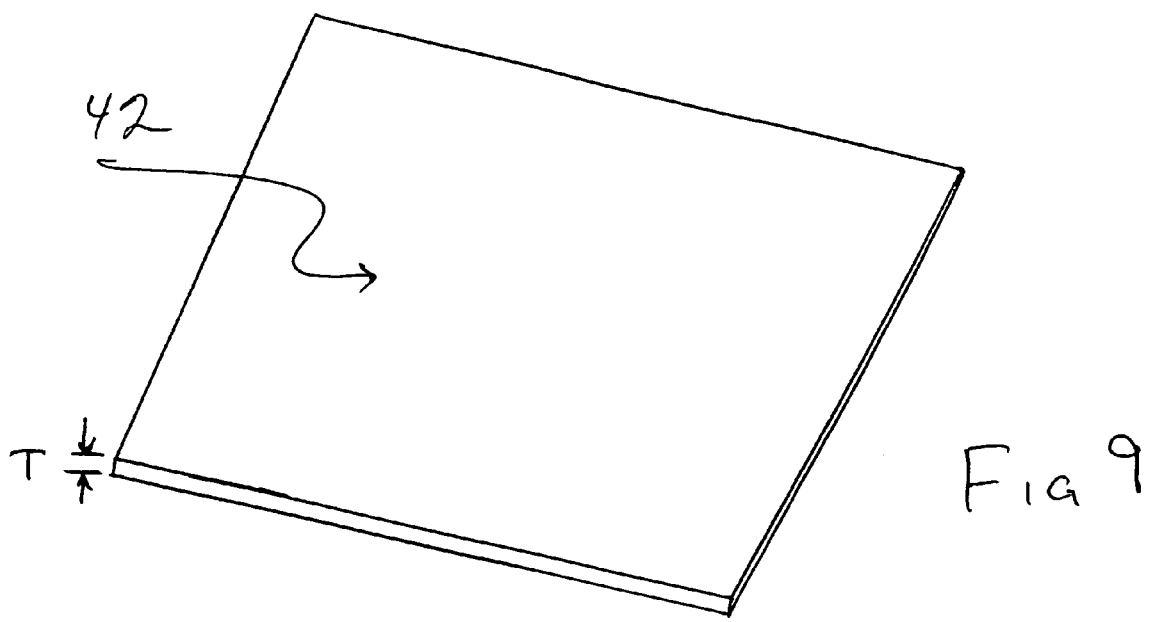
FIG. 9 shows a metal sheet from which a preferred embodiment of the reinforcing ring of the invention may be stamped.

The plastic fitting 12 is intended to and does receive a threaded male part 28 as seen in FIG. 7. Often the male part 28 is made of metal. The plastic fitting has a plastic body 30 which has inner plastic threads 32 for receiving the male part 28 in threaded engagement.

Preferably the guide portion 20 of the reinforcing ring 10 forms a guide portion 36 of the fitting 12 for guiding the male part 28 to the starter thread 24. This reduces the likelihood of cross-threading.

Preferably, the starter thread 24 of the reinforcing ring forms a lead face 40 of the first thread 32A of the threads 32 of the plastic body 30.

Preferably, when the reinforcing ring 10 is properly installed as part of plastic fitting 12, the radial portion 16 of the reinforcing ring 10 forms a forward protective portion 38 protecting the plastic body 30 from contact with the male part 28 as the male part 28 initially engages the fitting 12.

Preferably, the first tubular portion 14 of the reinforcing ring 10 surrounds at least a portion 34 of the plastic body 30.

Preferably, the plastic fitting 12 is molded with the first tubular portion 14 of the reinforcing ring 10 within and surrounded by a portion 44 the plastic body 30.

Typically there are several inner threads 32 of the plastic body 30. There will be at least a first inner thread 32A (as best seen in FIG. 7) closer to the starter thread 24 and a last inner thread 32B further away from the starter thread 24. Preferably the tubular portion 14 of the reinforcing ring 10 extends rearwardly to at least the last inner thread 32B of the plastic body 30. This will reduce the tendency for shearing the plastic fitting 2 upon over-tightening.

More preferably, the first tubular portion 14 extends rearwardly beyond the last thread 32B of the plastic body 30.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A reinforcing ring for a plastic fitting, comprising:
   a first tubular portion;
   a radial portion extending radially inwardly from a forward end of the tubular portion;
   a guide portion extending rearwardly from a radially-inner region of the radial portion;
   a starter thread extending radially inwardly from a rearward end of the guide portion; and
   wherein the reinforcing ring is stamped from a metal sheet; and
   wherein the starter thread is no more than 360° around the guide portion.

2. A reinforcing ring as defined in claim 1 wherein the guide portion is tubular.

3. A reinforcing as defined in claim 2 wherein the first tubular portion is conical.

4. A reinforcing ring as defined in claim 3 wherein the first tubular portion is conical at about 86° from horizontal.

5. A reinforcing ring as defined in claim 3 wherein the reinforcing ring is made of stainless steel.

6. A plastic fitting for receiving a threaded male part, comprising:
   a plastic body having inner plastic threads for receiving the male part in threaded engagement; and
   a reinforcing ring as defined in claim 3 wherein the first tubular portion of the reinforcing ring surrounds at least a portion of the plastic body.

7. A plastic fitting as defined in claim 6 wherein the starter thread of the reinforcing ring is aligned concentrically and axially with the threads of the plastic body.

8. A plastic fitting as defined in claim 7 wherein the guide portion of the reinforcing ring forms a guide portion of the fitting for guiding the male part to the starter thread.

9. A plastic fitting as defined in claim 8 the radial portion of the reinforcing ring forms a forward protective portion protecting the plastic body from contact with the male part as the male part initially engages the fitting.

10. A plastic fitting as defined in claim 9 the wherein plastic fitting is molded with the first tubular portion of the reinforcing ring positioned within and surrounded by the plastic body.

11. A plastic fitting as defined in claim 10 wherein there is a first inner thread and a last inner thread of the plastic body and the tubular portion of the reinforcing ring extends rearwardly to at least the last inner thread of the plastic body.

12. A plastic fitting as defined in claim 11 wherein the first tubular portion extends rearwardly beyond the last thread of the plastic body.

13. A plastic fitting as defined in claim 12 wherein the starter thread of the reinforcing ring forms a lead face of a first thread of the threads of the plastic body.

14. A reinforcing ring as defined in claim 1 wherein the guide portion is conical and extends rearwardly and inwardly.

15. A reinforcing ring as defined in claim 1 wherein the reinforcing ring is stamped from a stainless steel sheet.

16. A reinforcing ring as defined in claim 1 wherein each of the first tubular portion, radial portion and guide portion has a thickness and the thickness of each of the first tubular portion, radial portion and guide portion is relatively small compared to the diameter of the first tubular portion.

17. A plastic fitting for receiving a threaded male part, comprising:
   a plastic body having inner plastic threads for receiving the male part in threaded engagement; and
   a reinforcing ring as defined in claim 16 wherein the first tubular portion of the reinforcing ring surrounds at least a portion of the plastic body.

18. A plastic fitting as defined in claim 17 wherein:
   the starter thread of the reinforcing ring is aligned concentrically and axially with the threads of the plastic body;
   the guide portion of the reinforcing ring forms a guide portion of the fitting for guiding the male part to the starter thread;
   the radial portion of the reinforcing ring forms a forward protective portion protecting the plastic body from contact with the male part as the male part initially engages the fitting;

plastic fitting is molded with the first tubular portion of the reinforcing ring positioned within and surrounded by the plastic body;

there is a first inner thread and a last inner thread of the plastic body and the tubular portion of the reinforcing ring extends rearwardly to at least the last inner thread of the plastic body;

the first tubular portion extends rearwardly beyond the last thread of the plastic body; and the starter thread of the reinforcing ring forms a lead face of a first thread of the threads of the plastic body.

\* \* \* \* \*